(12) United States Patent
Kim et al.

(10) Patent No.: US 9,254,568 B2
(45) Date of Patent: Feb. 9, 2016

(54) ROBOT CONTROL METHODS

(71) Applicant: Samsung Electronics Co., Ltd., Suwon-Si, Gyeonggi-Do (KR)

(72) Inventors: Ji Young Kim, Anyang-si (KR); Kwang Kyu Lee, Yongin-si (KR); Woong Kwon, Seongnam-si (KR); Kyung Shik Roh, Seongnam-si (KR); Ju Suk Lee, Hwaseong-si (KR); Seung Yong Hyung, Yongin-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 80 days.

(21) Appl. No.: 14/153,302

(22) Filed: Jan. 13, 2014

(65) Prior Publication Data

US 2014/0343730 A1  Nov. 20, 2014

(30) Foreign Application Priority Data

May 14, 2013 (KR) .................. 10-2013-0054446

(51) Int. Cl.
*G05B 19/41* (2006.01)
*B25J 9/16* (2006.01)

(52) U.S. Cl.
CPC ..... *B25J 9/1625* (2013.01); *G05B 2219/40299* (2013.01); *Y10S 901/16* (2013.01)

(58) Field of Classification Search
CPC ........ G05B 19/19; G05B 19/25; G05B 19/31; G05B 19/37; G05B 19/41; G05B 19/22; G05B 2219/402343; Y10S 901/16; A61B 19/2211; A61B 19/2215; A61B 19/2223; A61B 19/2238; B25J 9/1625
See application file for complete search history.

(56) References Cited

U.S. PATENT DOCUMENTS

2011/0040404 A1* 2/2011 Diolaiti et al. ............... 700/245

FOREIGN PATENT DOCUMENTS

KR 2009-0019908 A 2/2009
KR 2010-0138898 A 12/2010

* cited by examiner

*Primary Examiner* — Khoi Tran
*Assistant Examiner* — Adam Mott
(74) *Attorney, Agent, or Firm* — Harness, Dickey & Pierce, P.L.C.

(57) ABSTRACT

A robot control method of controlling a robot that has a flexible module including 'n' first nodes participating in pan motion and 'n' second nodes participating in tilt motion may include: measuring a translational motion distance, a pan motion angle, and a tilt motion angle of the flexible module; calculating state vectors of the 'n' first nodes and the 'n' second nodes using the measured translational motion distance; calculating operating angle distribution rates of the 'n' first nodes and operating angle distribution rates of the 'n' second nodes using the calculated state vectors of the 'n' first nodes and the calculated state vectors of the 'n' second nodes; and/or calculating operating angles of the 'n' first nodes and operating angles of the 'n' second nodes using the calculated operating angle distribution rates and the measured pan motion angle and tilt motion angle.

20 Claims, 7 Drawing Sheets

ROBOT CONTROL METHODS

CROSS-REFERENCE TO RELATED APPLICATION(S)

This application claims priority from Korean Patent Application No. 10-2013-0054446, filed on May 14, 2013, in the Korean Intellectual Property Office (KIPO), the entire contents of which are incorporated herein by reference.

BACKGROUND

1. Field

Some example embodiments may relate to robot control methods of controlling flexible modules having variable degrees of freedom (DOF) and/or variably constrained operating angles.

2. Description of Related Art

Research on flexible mechanisms in various fields including rescue robots to search for survivors in a disaster area, medical robots, such as an endoscope and an active catheter, and military robots is underway due to operation and shape characteristics of the flexible mechanisms.

Such a flexible mechanism may have many constraints in indefinite and unspecific working environments. Thereby, the DOF of the flexible mechanism is greatly changed and, thus, the flexible mechanism may not be effectively controlled or limited using a conventional robot control method.

SUMMARY

Some example embodiments may provide robot control methods that effectively control flexible modules having variable DOF and/or variably constrained operating angles according to working environments and/or working contents.

In some example embodiments, a robot control method of controlling a robot that has a flexible module including 'n' first nodes participating in pan motion and 'n' second nodes participating in tilt motion may comprise: measuring a translational motion distance, a pan motion angle, and a tilt motion angle of the flexible module; calculating state vectors of the 'n' first nodes and the 'n' second nodes using the measured translational motion distance; calculating operating angle distribution rates of the 'n' first nodes and operating angle distribution rates of the 'n' second nodes using the calculated state vectors of the 'n' first nodes and the calculated state vectors of the 'n' second nodes; and/or calculating operating angles of the 'n' first nodes and operating angles of the 'n' second nodes using the calculated operating angle distribution rates and the measured pan motion angle and tilt motion angle.

In some example embodiments, the measuring the translational motion distance, the pan motion angle, and the tilt motion angle of the flexible module may comprise measuring a rotational motion angle of the flexible module.

In some example embodiments, the robot control method may further comprise, after the calculating the operating angles of the 'n' first nodes and the operating angles of the 'n' second nodes: estimating a position of an end of the flexible module using the calculated operating angles of the 'n' first nodes and the calculated operating angles of the 'n' second nodes and the measured translational motion distance and rotational motion angle.

In some example embodiments, the estimating the position of the end of the flexible module may be performed by applying the operating angles of the 'n' first nodes, the operating angles of the 'n' second nodes, the translational motion distance, and the rotational motion angle to a forward kinematics function.

In some example embodiments, the calculating the operating angle distribution rates of the 'n' first nodes and the operating angle distribution rates of the 'n' second nodes may comprise calculating the operating angle distribution rates of the 'n' first nodes; and/or calculating the operating angle distribution rates of the 'n' second nodes.

In some example embodiments, the 'n' first nodes may be arranged from a proximal to a distal such that a first one of the 'n' first nodes is located at the proximal and an $n^{th}$ one of the 'n' first nodes is located at the distal.

In some example embodiments, the calculating the operating angle distribution rates of the 'n' first nodes may further comprise judging whether or not a sum of the state vectors of the 'n' first nodes approaches '0'; scaling all the state vectors of the 'n' first nodes to '0', upon judging that the sum of the state vectors of the 'n' first nodes approaches '0'; and/or calculating the operating angle distribution rates of the 'n' first nodes by dividing the scaled state vectors of the 'n' first nodes by a sum of the scaled state vectors.

In some example embodiments, the robot control method may further comprise, after the judging whether or not the sum of the state vectors of the 'n' first nodes approaches '0': judging whether or not any first node having a state vector less than '1' is present among the 'n' first nodes, upon judging that the sum of the state vectors of the 'n' first nodes is greater than '0' by a threshold value or more; upon judging that the any first node having the state vector less than '1' is present among the 'n' first nodes, scaling the state vector of the corresponding first node to the calculated state vector, scaling the state vectors of the first nodes, located in the proximal direction based on a corresponding first node, to '0', and scaling the state vectors of the first nodes, located in the distal direction based on the corresponding first node, to '1'; and/or calculating the operating angle distribution rates of the 'n' first nodes by dividing the scaled state vectors of the 'n' first nodes by the sum of the scaled state vectors.

In some example embodiments, the robot control method may further comprise, after the judging whether or not the any first node having the state vector less than '1' is present among the 'n' first nodes: upon judging that the any first node having the state vector less than '1' is not present among the 'n' first nodes, scaling all the state vectors of the 'n' first nodes to '1'; and/or calculating the operating angle distribution rates of the 'n' first nodes by dividing the scaled state vectors of the 'n' first nodes by the sum of the scaled state vectors.

In some example embodiments, the 'n' second nodes may be arranged from a proximal to a distal such that a first one of the 'n' second nodes is located at the proximal and an $n^{th}$ one of the 'n' second nodes is located at the distal.

In some example embodiments, the calculation of the operating angle distribution rates of the 'n' second nodes may comprise judging whether or not a sum of the state vectors of the 'n' second nodes approaches '0'; scaling all the state vectors of the 'n' second nodes to '0', upon judging that the sum of the state vectors of the 'n' second nodes approaches '0'; and/or calculating the operating angle distribution rates of the 'n' second nodes by dividing the scaled state vectors of the 'n' second nodes by a sum of the scaled state vectors.

In some example embodiments, the robot control method may further comprise, after the judging whether or not the sum of the state vectors of the 'n' second nodes approaches '0': judging whether or not any second node having a state vector less than '1' is present among the 'n' second nodes, upon judging that the sum of the state vectors of the 'n' second nodes is greater than '0' by a threshold value or more; upon judging that the any second node having the state vector less than '1' is present among the 'n' second nodes, scaling the state vector of a corresponding second node to the calculated state vector, scaling the state vectors of the second nodes, located in the proximal direction based on the corresponding second node, to '0', and scaling the state vectors of the second nodes, located in the distal direction based on the corresponding second node, to '1'; and/or calculating the operating angle distribution rates of the 'n' second nodes by dividing the scaled state vectors of the 'n' second nodes by the sum of the scaled state vectors.

In some example embodiments, the robot control method may further comprise, after the judging whether or not the any second node having the state vector less than '1' is present among the 'n' second nodes: upon judging that the any second node having the state vector less than '1' is not present among the 'n' second nodes, scaling all the state vectors of the 'n' second nodes to '1'; and/or calculating the operating angle distribution rates of the 'n' second nodes by dividing the scaled state vectors of the 'n' second nodes by the sum of the scaled state vectors.

In some example embodiments, the calculating the operating angles of the 'n' first nodes and the operating angles of the 'n' second nodes may be performed by multiplying the calculated operating angle distribution rates of the 'n' first nodes by the measured pan motion angle and multiplying the calculated operating angle distribution rates of the 'n' second nodes by the measured tilt motion angle.

In some example embodiments, the robot control method may further comprise, after the measuring the translational motion distance, the pan motion angle, and the tilt motion angle of the flexible module: determining the degrees of freedom (DOF) of the flexible module using the measured translational motion distance of the flexible module; and/or controlling the flexible module such that desired operations may be performed according to the determined DOF of the flexible module.

In some example embodiments, a robot control method of controlling a robot that has a flexible module including 'n' first nodes participating in pan motion may comprise measuring a translational motion distance and a pan motion angle of the flexible module; calculating state vectors of the 'n' first nodes using the measured translational motion distance; calculating operating angle distribution rates of the 'n' first nodes using the calculated state vectors of the 'n' first nodes; and/or calculating operating angles of the 'n' first nodes using the calculated operating angle distribution rates and the measured pan motion angle.

In some example embodiments, the flexible module of the robot may further include 'n' second nodes participating in tilt motion.

In some example embodiments, a robot control method of controlling a robot that has a flexible module including 'n' second nodes participating in tilt motion may comprise measuring a translational motion distance and a tilt motion angle of the flexible module; calculating state vectors of the 'n' second nodes using the measured translational motion distance; calculating operating angle distribution rates of the 'n' second nodes using the calculated state vectors of the 'n' second nodes; and/or calculating operating angles of the 'n' second nodes using the calculated operating angle distribution rates and the measured tilt motion angle.

In some example embodiments, the flexible module of the robot may further include 'n' first nodes participating in pan motion.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Figure 1:
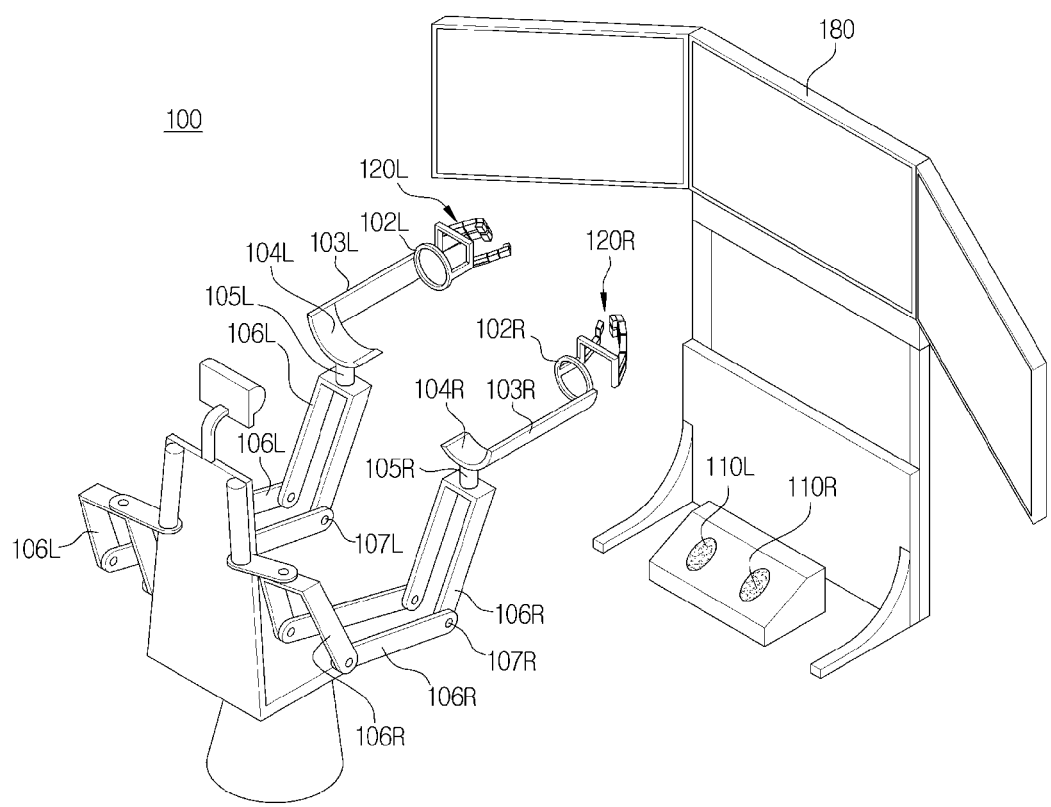
FIG. 1 is a view illustrating a master console of a single port surgical robot.

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

Although a single port surgical robot (hereinafter, referred to as a 'surgical robot') will be exemplarily described in the following description, this is only one example and example embodiments are not limited thereto. For example, some example embodiments may be applied to not only various industrial service robot systems including a remote robot system performing various operations in space, a hazardous material handling robot which is remotely controlled, a pipe cleaning robot, etc., but also to all flexible mechanisms in which an end effector is mounted at the end of a flexible module.

A surgical robot generally includes a master console 100 and a slave device 200. The master console 100 remotely controls the slave device 200. The master console 100 generates a control signal according to operation of an operator and transmits the generated control signal to the slave device 200. The slave device 200 receives the control signal from the master console 100 and is operated according to the received control signal.

FIG. 1 is a view illustrating the external appearance of the master console 100.

With reference to FIG. 1, the master console 100 may include an input unit 110L, 110R, 120L, and 120R, and a display unit 180.

The input unit 110L, 110R, 120L, and 120R receives instructions to remotely control operation of the slave device 200 (with reference to FIG. 2) from an operator. Although FIG. 1 illustrates the input unit 110L, 110R, 120L, and 120R as including two clutch pedals 110L and 110R and two handles 120L and 120R, example embodiments are not limited thereto, and the input unit 110L, 110R, 120L, and 120R may further include a switch, a button, a voice recognition device, etc.

The clutch pedals 110L and 110R may be used to change between operating modes of the surgical robot. For example, if the left clutch pedal 110L is operated, a guide tube operating mode may be performed, and if the right clutch pedal 110R is operated, a surgical instrument operating mode may be performed. When the guide tube operating mode is performed, the operator may change the position and pose of a guide tube 213 (with reference to FIG. 2) by operating the handles 120L and 120R. Further, when the surgical instrument operating mode is performed, the operator may change the positions, poses, and operation of surgical instruments 215 (with reference to FIG. 3) by operating the handles 120L and 120R.

The handles 120L and 120R control movement of the guide tube 213, the surgical instruments 215 and an endoscope 217 provided on the slave device 200. In some example embodiments, the handles 120L and 120R may be haptic devices, but are not limited thereto. Further, the handles 120L and 120R may include at least one multi-joint robot finger. Here, the multi-joint robot fingers may be arranged in a shape similar to a human hand. FIG. 1 illustrates that three multi-joint robot fingers are provided at positions corresponding to the thumb, the forefinger, and the middle finger of a human hand. Although FIG. 1 illustrates the handles 120L and 120R as including three multi-joint robot fingers, the number and positions of the multi-joint robot fingers are not limited thereto.

Further, each of the multi-joint robot fingers may include plural links and plural joints. Here, 'joint' means a connection region between a first link and a second link, and may have at least 1 degree of freedom. DOF denotes DOF in forward kinematics or inverse kinematics. The DOF of a mechanism refers to the number of independent movements of the mechanism or the number of variables determining independent movements of relative positions of respective links. For example, an object in a 3D space formed by the X-axis, the Y-axis, and the Z-axis has at least 1 DOF from among 3 DOF to determine the spatial position of the object (positions of the object on the respective axes) and 3 DOF to determine the spatial orientation of the object (rotation angles of the object about the respective axes). In more detail, it may be understood that, if the object is movable along the respective axes and is rotatable about the respective axes, the object has 6 DOF.

Further, a detection unit to detect information regarding the state of each joint may be provided at each joint of the multi-joint robot fingers. Here, the detection unit may include a position detection unit to detect the position of each joint (e.g., a joint angle), and a velocity detection unit to detect the velocity of each joint.

Further, an annular insertion hole into which the tip of the finger of an operator is inserted may be provided at each of the front ends of the multi-joint robot fingers. Therefore, when the operator moves the fingers under the condition that the fingers are inserted into the insertion holes, the multi-joint robot fingers move corresponding to movement of the fingers of the operator, and the detection units provided at the respective joints of the multi-joint robot fingers may detect information regarding the states of the moving joints. The positions and velocities of the respective joints detected through the detection units may be converted into control signals regarding target positions and velocities which the respective joints of the slave device 200 should follow, and the control signals may be transmitted to the slave device 200 through a network. Here, 'network' may be a wired network, a wireless network, or a wired/wireless hybrid network.

Further, in some example embodiments, the handles 120L and 120R are not limited to a hand shape including the multi-joint robot fingers shown in FIG. 1, and may have a pencil shape, a stick shape, or the same shape as an actual surgical instrument. Further, although FIG. 1 illustrates the left handle 120L and the right handle 120R as having the same shape, the left handle 120L and the right handle 120R are not limited thereto and may have different shapes.

Further, as exemplarily shown in FIG. 1, support links 103L and 103R mechanically connected to the respective handles 120L and 120R may be provided. The support links 103L and 103R serve to support the arms of the operator from the wrists to the elbows. For this purpose, the support links 103L and 103R may include wrist support parts 102L and 102R and elbow support parts 104L and 104R.

The wrist support parts 102L and 102R may be arranged at positions corresponding to the wrists of the operator and have various shapes. For example, FIG. 1 illustrates the wrist support parts 102L and 102R as having an annular shape. The operator may put the hands into the wrist support parts 102L and 102R and, then, insert the tips of the fingers into the insertion holes provided at the front ends of the handles 120L and 120R. Further, force/torque detection units may be provided at the wrist support parts 102L and 102R. The force/torque detection units detect force applied to the handles 120L and 120R by the operator.

The elbow support parts 104L and 104R may be arranged at positions corresponding to the elbows of the operator. The elbow support parts 104L and 104R may have a U-shape, as exemplarily shown in FIG. 1, but are not limited thereto.

The support links 103L and 103R including the wrist support parts 102L and 102R and the elbow support parts 104L and 104R keep the arms of the operator in a stable state, thus allowing the operator to stably operate the master console 100.

Further, at least one connection link 106L or 106R mechanically connecting each of the support links 103L and 103R to a chair on which the operator sits may be provided. Joints 105L and 105R may be provided between the connection links 106L and 106R and the support links 103L and 103R. Further, plural connection links 106L and 106R may be provided, as exemplarily shown in FIG. 1. In this case, joint 107L and 107R connecting the plural connection links 106L and 106R may be provided.

Although FIG. 1 illustrates the two handles 120L and 120R as being mechanically connected to the chair by the support links 103L and 103R and the connection links 106L and 106R, the structure of the master console 100 in example embodiments is not limited thereto. For example, the support links 103L and 103R and the connection links 106L and 106R may be omitted, and, if the support links 103L and 103R and the connection links 106L and 106R are omitted, each of the handles 120L and 120R may further include a communication unit (not shown) to transmit and receive data through wired communication or wireless communication with the control unit (not shown) of the master console 100.

The display unit 180 may include one or more monitors, as exemplarily shown in FIG. 1, and be configured such that information necessary in surgery may be respectively displayed through the respective monitors. As one example, if the display unit 180 includes three monitors, one monitor may display a real image collected through the endoscope 217 and a virtual image which is a 3D image converted from a medical image of the patient prior to surgery, and two other monitors may respectively display information regarding the operating state of the slave device 200 and patient information. As another example, the plural monitors may display the same image. In this case, the same image may be displayed through the respective monitors, or one image may be displayed through the entirety of the plural monitors. Further, the number of monitors may be variously determined according to types and kinds of information to be displayed. The display unit 180 may include a liquid crystal display (LCD), a light emitting diode (LED), an organic light emitting diode (OLED), a plasma display panel (PDP), or a combination thereof, but is not limited thereto.

Here, "patient information" may be information indicating the state of the patient, for example, biometric information, such as body temperature, pulse, respiration, and blood pressure. In order to provide such biometric information to the master console 100, the slave device 200, which will be described later, may further include a biometric information measurement unit including a body temperature measurement module, a pulse measurement module, a respiration measurement module, and a blood pressure measurement module. For this purpose, the master console 100 may further include a signal processing unit (not shown) to receive and process the biometric information transmitted from the slave device 200 and to output the processed biometric information to the display unit 180.

Figure 2:
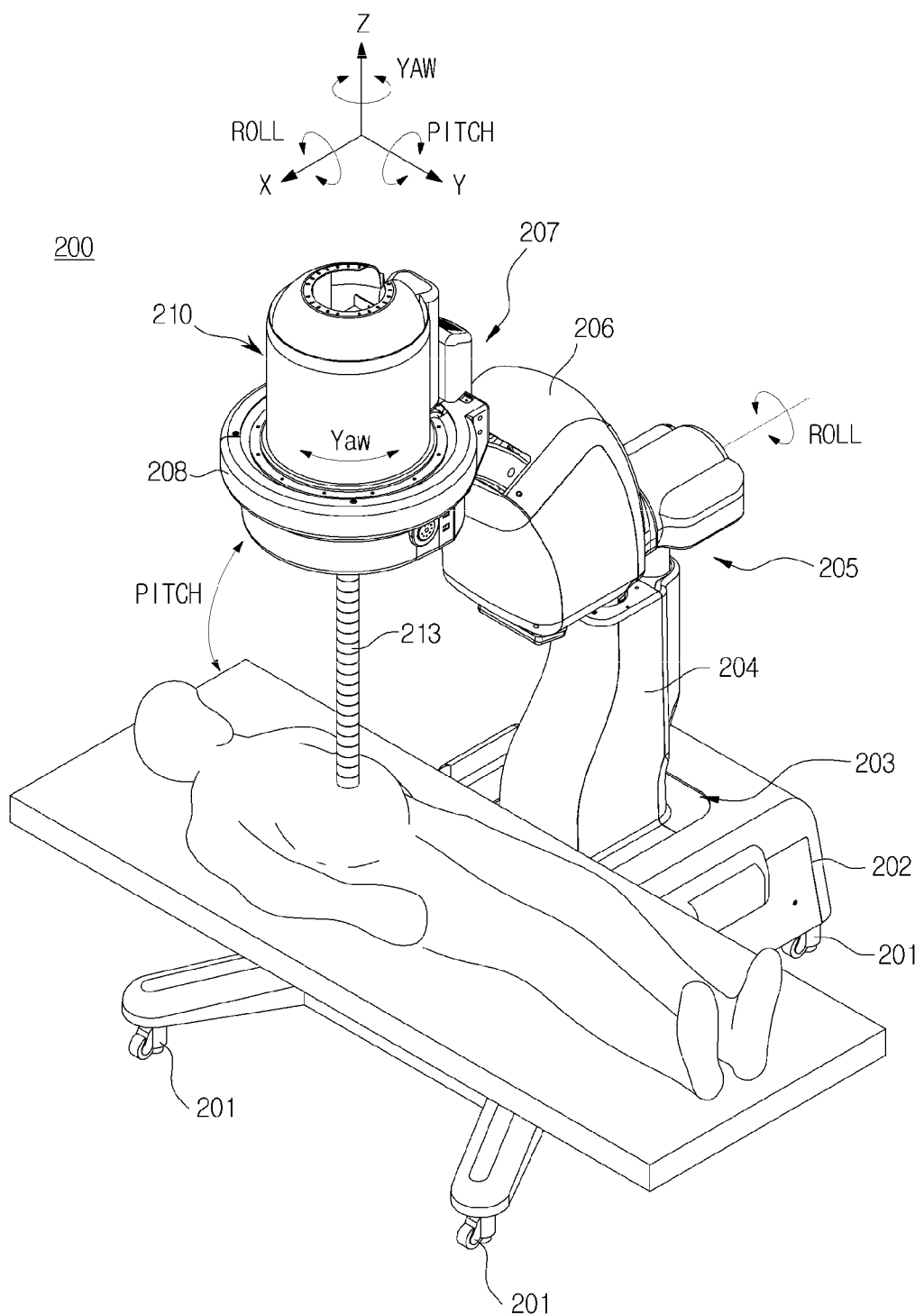
FIG. 2 is a view illustrating the external appearance of a slave device of the single port surgical robot.

FIG. 2 is a view illustrating the external appearance of the slave device 200.

With reference to FIG. 2, the slave device 200 may include a caster unit 201, a body 202, a robot arm 203~208, and a surgical instrument assembly 210.

The caster unit 201 serves to move the slave device 200, and may be mounted at the lower part of the body 202. The caster unit 201 may include plural casters, and a lever (not shown) to change the operating state of each caster may be provided at each caster. The operator may change the operating states of the casters by adjusting the positions of the levers (not shown). The operating states of the casters (not shown) may include a brake state, a free swivel state, and a directional lock (or swivel lock) state.

The robot arm 203~208 may be provided at the upper part of the body 202. The robot arm 203~208 may move the surgical instrument assembly 210 along at least one of the X-axis, the Y-axis, and the Z-axis, or rotate the surgical instrument assembly 210 about at least one of the X-axis, the Y-axis, and the Z-axis. Further, the robot arm 203~208 may support the surgical instrument assembly 210 so that the position and pose of the surgical instrument assembly 210 may be maintained during surgery.

The robot arm 203~208 may include plural link units 204, 206, and 208, and plural joint units 203, 205, and 207. In more detail, the robot arm 203~208 may include a first joint unit 203, a first link unit 204, a second joint unit 205, a second link unit 206, a third joint unit 207, and a third link unit 208.

The first link unit 204 may include a first link and a casing surrounding the first link. The first link may have a rectilinear column shape and be provided in the direction perpendicular to the body 202. That is, the first link may be provided in the direction perpendicular to the ground.

The first joint unit 203 is provided at the connection region between the body 202 and the first link unit 204, and may include a prismatic joint moving along a designated axis among the X-axis, the Y-axis, and the Z-axis. The first joint unit 203 serves to perform linear motion of the surgical instrument assembly 210, and may have 3 DOF but is not limited thereto. For this purpose, the first joint unit 203 may include a linear driving unit, and the linear driving unit may include a linear motion guide guiding linear motion along a specific axis and a motor providing driving force to the linear motion guide.

The second link unit 206 may be arranged at the end of the first link unit 204 and include a second link and a casing surrounding the second link. The second link may have a curved shape, as exemplarily shown in FIG. 2, but is not limited thereto.

The second joint unit 205 is provided at the connection region between the first link unit 204 and the second link unit 206, and may include a revolute joint rotating about a designated axis among the X-axis, the Y-axis, and the Z-axis. The second joint unit 205 serves to perform rotary motion of the surgical instrument assembly 210, and may have 2 DOF but is not limited thereto. 2 DOF may include rotation in the roll direction and rotation in the pitch direction, but is not limited thereto. For this purpose, the second joint unit 205 may include a roll driving unit and a pitch driving unit. The roll driving unit and the pitch driving unit may include a vacuum pump and/or a hydraulic pump, but are not limited thereto.

The third link unit 208 may be arranged at the end of the second link unit 206 and include an annular third link, as exemplarily shown in FIG. 2. The surgical instrument assembly 210 may be arranged on the annular third link.

The third joint unit 207 is provided at the connection region between the second link unit 206 and the third link unit 208, and may include a revolute joint rotating about a designated axis among the X-axis, the Y-axis, and the Z-axis. The third joint unit 207 serves to perform rotary motion of the surgical instrument assembly 210, and may have 1 DOF but is not limited thereto. In more detail, 1 DOF may include rotation in the yaw direction, but is not limited thereto. For this purpose, the third joint unit 207 may include a yaw driving unit. The yaw driving unit may include a vacuum pump and/or a hydraulic pump, but is not limited thereto.

Figure 3:
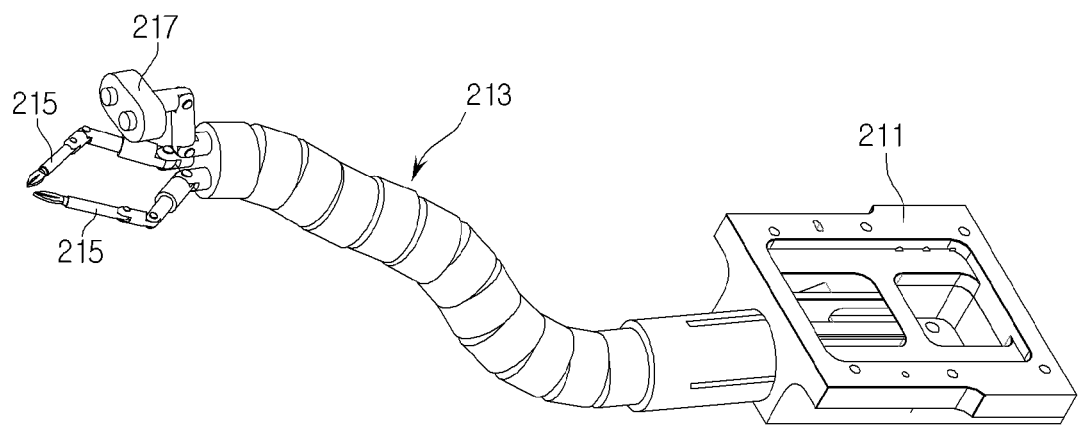
FIG. 3 is a view illustrating a surgical instrument assembly.
Figure 4:
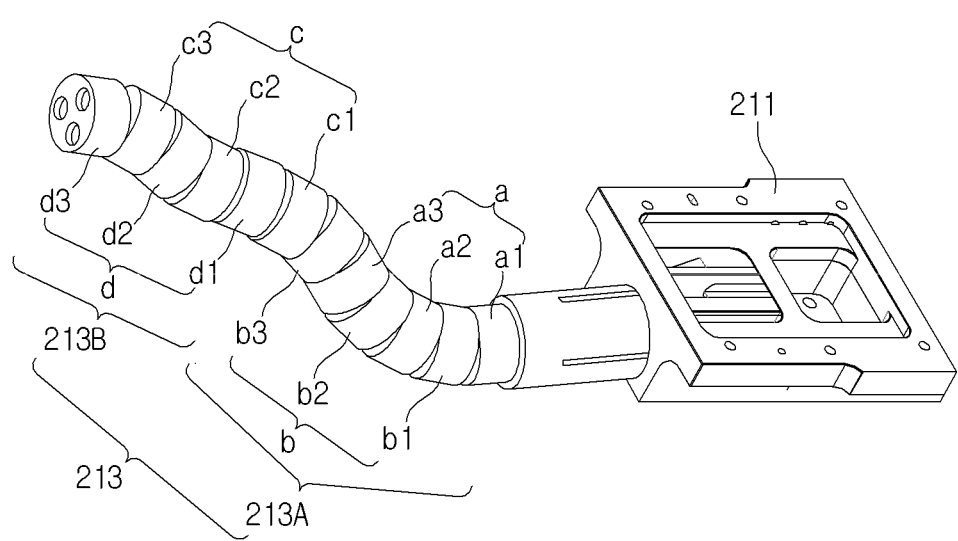
FIG. 4 is a view illustrating the structure of a guide tube in detail.
Figure 5:
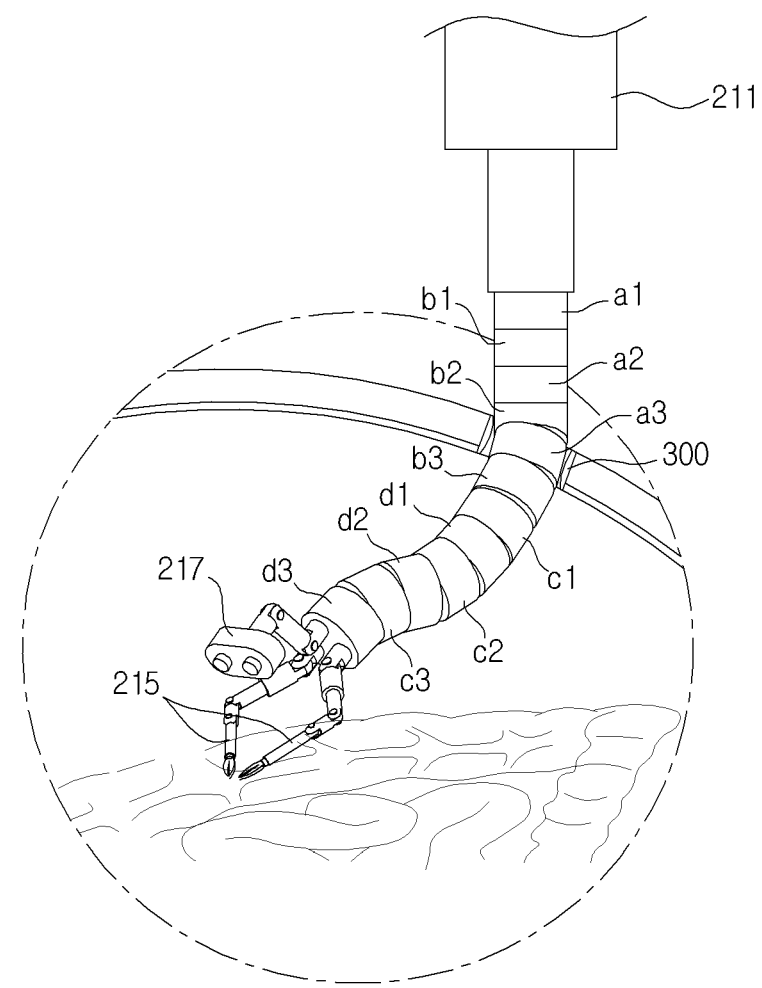
FIG. 5 is a view illustrating a state in which the guide tube and surgical instruments are inserted into the body of a patient through a trocar.

FIG. 3 is a view illustrating the surgical instrument assembly 210, FIG. 4 is a view illustrating flexible modules and DOF thereof, and FIG. 5 is a view illustrating a state in which the flexible modules and the surgical instruments are inserted into the body of a patient through a trocar.

With reference to FIG. 3, the surgical instrument assembly 210 may include a cylindrical casing, and the surgical instruments 215, the endoscope 217, and the guide tube 213 mounted in the casing. Further, the surgical instrument assembly 210 may include a base station 211 to which the surgical instruments 215, the endoscope 217, and the guide tube 213 are fixed, and the base station 211 may be detachably combined with the third link unit 208 but is not limited thereto.

The surgical instrument 215 may include a shaft and an end effector combined with the end of the shaft. The shaft may generally use a tubular member, such as a cylindrical member. Thereby, a cable connected to the end effector may be accommodated in the shaft so that driving force according to a control signal generated by the operator may be transmitted to the end effector. The end effector denotes a part of the surgical instrument 215 which is actually applied to the surgical region of the patient and, for example, may include a clamp, a grasper, scissors, a stapler, a needle holder, a scalpel, or a cutting blade, but is not limited thereto. That is, the end effector may use any known tool which is necessary in surgery.

Among these surgical instruments 215, at least one surgical instrument 215 selected by the operator, together with the endoscope 217, may pass through the guide tube 213 and then be inserted into the body of the patient. The endoscope 217 may include a stereo camera and a lighting unit to acquire a 3D image, but is not limited thereto. The stereo camera may employ a complementary metal-oxide semiconductor (CMOS) camera or a charge coupled device (CCD) camera, but is not limited thereto. Further, as the endoscope 217, not only a laparoscope mainly used in robot surgery but also various surgical endoscopes, such as a thoracoscope, an arthroscope, a rhinoscope, a cystoscope, a rectoscope, a duodenoscope, a cardioscope, etc. may be employed.

In this way, FIG. 5 illustrates a state in which the surgical instruments 215 and the endoscope 217 are inserted into the body of a patient through the guide tube 213. As exemplarily shown in FIG. 5, the guide tube 213 may pass through a trocar 300 installed at an invasive hole formed in the body of the patient and be inserted into the body of the patient, thus being bent toward a surgical region. Here, the trocar 300 means a device installed at the invasive hole for the purpose of providing a path through which the guide tube 213 passes and preventing leakage of gas filing the abdominal cavity of the patient to form a surgical space. By installing the trocar 300, damage to the inner circumferential surface of the invasive hole, when the guide tube 213 is inserted into the abdominal cavity or pulled out of the abdominal cavity and leakage of gas filling the abdominal cavity, may be prevented.

The guide tube 213 has a path through which the surgical instruments 215 and the endoscope 217 may pass, and is inserted into the trocar 300 installed at the invasive hole and bent toward the surgical region so as to allow the surgical instruments 215 and the endoscope 217 to reach the surgical region, as exemplarily shown in FIGS. 4 and 5. Although some example embodiments illustrate the guide tube 213 as including two flexible modules 213A and 213B, as exemplarily shown in FIG. 4, the guide tube 213 may include one flexible module or include three or more flexible modules. Hereinafter, with reference to FIG. 4, the guide tube 213 including two flexible modules 213A and 213B will be exemplarily described, and for convenience of description, among the two flexible modules 213A and 213B, a flexible module 213A located close to the base station 211 will be referred to as a first flexible module and a flexible module 213B located far from the base station 211 will be referred to as a second flexible module. Further, a position located closest to the base station 211 will be referred to as a 'proximal', and a position located farthest from the base station 211 will be referred to as an 'distal'.

With reference to FIG. 4, the guide tube 213 may include 'n' first nodes 'a' and 'c' participating in pan motion and 'n' second nodes 'b' and 'd' participating in tilt motion. In more detail, the first flexible module 213A of the guide tube 213 includes three first nodes a1, a2, and a3 participating in pan motion and three second nodes b1, b2, and b3 participating in tilt motion, and the first nodes a1, a2, and a3 and the second nodes b1, b2, and b3 may be alternately connected. In the same manner, the second flexible module 213B of the guide tube 213 includes three first nodes c1, c2, and c3 participating in pan motion and three second nodes d1, d2, and d3 participating in tilt motion, and the first nodes c1, c2, and c3 and the second nodes d1, d2, and d3 may be alternately connected.

The first one a1 of the first nodes a1, a2, and a3 of the first flexible module 213A may be arranged closest to the base station 211, e.g., at the proximal, the third one d3 among the second nodes d1, d2, and d3 of the second flexible module 213B may be arranged farthest from the base station 211, e.g., at the distal. Thereby, when the guide tube 213 is inserted into the trocar 300, the second node d3 of the second flexible module 213B may be first inserted into the trocar 300 and the first one a1 of the first flexible module 213A may be lastly inserted into the trocar 300.

In some example embodiments, the first flexible module 213A and the second flexible module 213B may respectively have 2 DOF including a pan DOF and a tilt DOF. Therefore, the guide tube 213 may finally have 6 DOF including a translational motion (forward motion and backward motion) DOF and a rotational motion DOF of the base station 211, but is not limited thereto. That is, the guide tube 213 may have increased or decreased DOF according to the number of flexible modules.

Further, the first nodes a1, a2, and a3 and the second nodes b1, b2, and b3 of the first flexible module 213A and the first nodes c1, c2, and c3 and the second nodes d1, d2, and d3 of the second flexible module 213B may have operating angles. Hereafter, an operating angle state when movement of each node is completely free will be defined as '1', and an operating angle state when movement of each node is completely constrained will be defined as '0'. Here, the case in which movement of the node is completely free may mean a state in which there is nothing constraining movement of the node, e.g., in some example embodiments, a state in which the node has completely passed through the trocar 300 and is located within the abdominal cavity so as to be freely movable, and the case in which movement of the node is completely constrained may mean a state before the node passes through the trocar 300, e.g., in some example embodiments, a state in which the node is located between the trocar 300 and the base station 211 so as not to be movable.

For example, with reference to FIG. 5, since the first one a1 and the second one a2 of the three first nodes a1, a2, and a3 of the first flexible module 213A are located between the trocar 300 and the base station 211, the first one a1 and the second one a2 of the first nodes a1, a2, and a3 are not movable and thus, the operating angle states thereof may be set to '0'. In the same manner, since the first one b1 and the second one b2 of the three second nodes b1, b2, and b3 of the first flexible module 213A are located between the trocar 300 and the base station 211, the first one b1 and the second one b2 of the second nodes b1, b2, and b3 are not movable and thus, the operating angle states thereof may be set to '0'.

On the other hand, with reference to FIG. 5, the third one a3 of the three first nodes a1, a2, and a3 of the first flexible module 213A is passing through the trocar 300, and the third one b3 of the three second nodes b1, b2, and b3 of the first flexible module 213A has completely passed through the trocar 300 and enters the abdominal cavity of a patient. In this way, the operating angle state of the first one a3 of the first nodes a1, a2, and a3 passing through the trocar 300 may transition from '0' to '1', and the operating angle state of the second one b3 of the second nodes b1, b2, and b3, having completely passed through the trocar 300, may be '1'. They may mean a state in which the third one a3 of the first nodes a1, a2, and a3 is movable such that movement of the third one a3 of the first nodes a1, a2, and a3 is constrained to some degree, and a state in which the third one b3 of the second nodes b1, b2, and b3 is completely freely movable.

Further, the three first nodes c1, c2, and c3 and the three second nodes d1, d2, and d3 of the second flexible module 213B have completely passed through the trocar 300, are located within the abdominal cavity, and are thus freely movable. Therefore, the operating angle states of the three first nodes c1, c2, and c3 and the three second nodes d1, d2, and d3 may be '1'.

In such a manner, operating angle states of all nodes of the guide tube 213 before, during, and after passing through the trocar 300 may be determined. That is, operating angle states of all nodes of the guide tube 213 varied by the trocar 300 may be determined.

In general, in order to achieve safety during surgery using a robot, operation of a surgical instrument should be controlled by accurately estimating the pose of the surgical instrument entering the body of a patient. At this time, accurate estimation of the pose of the guide tube 213 through which the surgical instrument passes is required. However, the DOF of the flexible guide tube 213 in some example embodiments may be variably changed and a node, the operating angle of which is constrained, is varied according to the translational motion distance of the flexible guide tube 213, e.g., the insertion depth of the flexible guide tube 213 and, thus, a control method applied to a mechanism having fixed DOF and operating angle is not easily applied to the flexible guide tube 213. Therefore, some example embodiments disclose an effective control method of a mechanism having variable DOF or variable operating angle constraint.

Figure 6:
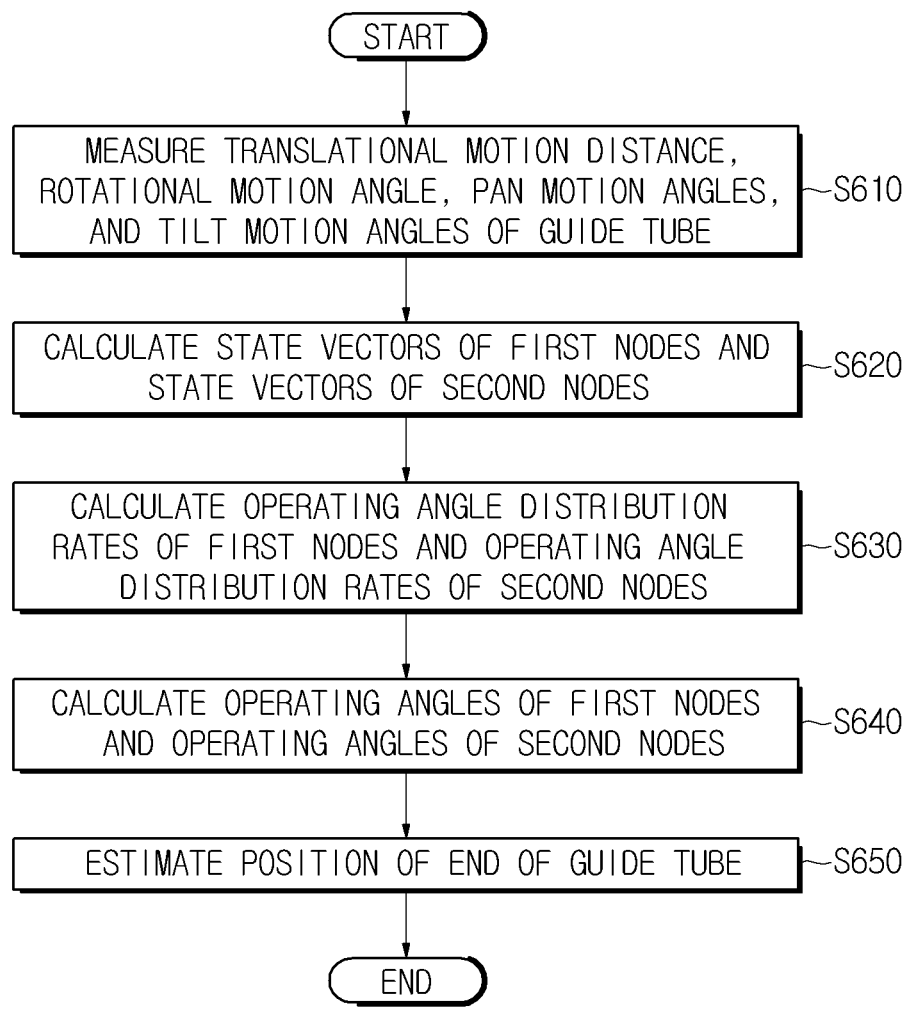
FIG. 6 is a flowchart sequentially illustrating one example of a robot control method.

FIG. 6 is a flowchart sequentially illustrating one example of a robot control method.

First, with reference to FIG. 6, the translational motion (forward moving/backward moving) distance, rotational motion angle, pan motion angles, and tilt motion angles of the guide tube 213 are measured (Operation S610). Here, measurement of the translational motion distance, rotational motion angle, pan motion angles, and tilt motion angles of the guide tube 213 may be performed using detection units respectively provided at a driving unit generating the translational motion of the guide tube 213, a driving unit generating the rotational motion of the guide tube 213, a driving unit generating the pan motions of the guide tube 213, and a driving unit generating the tilt motions of the guide tube 213, but is not limited thereto. The 'driving unit' may employ a motor, but is not limited thereto. Further, the 'detection unit' may employ an encoder, but is not limited thereto.

The number of the pan motion angles and the number of the tilt motion angles measured in Operation S610 may be varied according to the number of flexible modules provided on the guide tube 213. For example, if the guide tube 213 includes two flexible modules 213A and 213B, as exemplarily shown in FIG. 4, the number of the measured pan motion angles and the number of the measured tilt motion angles may each be 2. Hereinafter, for convenience of description, the pan motion angle and the tilt motion angle of the first flexible module 213A will be referred to as a first pan motion angle and a first tilt motion angle, and the pan motion angle and the tilt motion angle of the second flexible module 213B will be referred to as a second pan motion angle and a second tilt motion angle.

Thereafter, state vectors of the first nodes a1, a2, and a3 and the second nodes b1, b2, and b3 of the first flexible module 213A and the first nodes c1, c2, and c3 and the second nodes d1, d2, and d3 of the second flexible module 213B are calculated using the measured translational motion distance of the guide tube 213 (Operation S620). Calculation of the state vectors of the first nodes and the state vectors of the second nodes using the measured translational motion distance of the guide tube 213 may be determined using a linear function or a sinusoidal function of the translational motion distance, but is not limited thereto. Here, the linear function or the sinusoidal function may be properly used according to whether or not the end of the trocar 300, e.g., an outlet of the trocar 300 through which the guide tube 213 comes out of the trocar 300, has a linear shape or a curved shape.

As described above, the operating angle states of the respective nodes of the guide tube 213 are defined as '1', '0' or a value of '0~1'. Thereby, in the state shown in FIG. 5, for example, if the guide tube 213 is inserted into the body of the patient and the third one a3 of the three first nodes a1, a2, and a3 of the first flexible module 213A of the guide tube 213 are passing through the trocar 300, the state vectors of the first nodes a1, a2, and a3 and the second nodes b1, b2, and b3 of the first flexible module 213A and the first nodes c1, c2, and c3 and the second nodes d1, d2, and d3 of the second flexible module 213B may be expressed as an n×1 vector type, as follows.

PP=[0 0 x]^T
PT=[0 0 1]^T
DP=[1 1 1]^T
DT=[1 1 1]^T

Here, 'PP' represents the first nodes a1, a2, and a3 of the first flexible module 213A, 'PT' represents the second nodes b1, b2, and b3 of the first flexible module 213A, 'DP' represents the first nodes c1, c2, and c3 of the second flexible module 213B, and 'DT' represents the second nodes d1, d2, and d3 of the second flexible module 213B.

That is, with reference to FIG. 5, the first nodes c1, c2, and c3 and the second nodes d1, d2, and d3 of the second flexible module 213B have completely passed through the trocar 300 and movement thereof is completely free and thus, the operating angle states of the respective nodes c1, c2, c3, d1, d2, and d3 may have a value of '1', and the first one a1 and second one a2 of the first nodes a1, a2, and a3 and the first one b1 and second one b2 of the second nodes b1, b2, and b3 of the first flexible module 213A are located between the trocar 300 and the base station 211 and movement thereof is completely constrained and thus, the operating angle states of the respective nodes a1, a2, b1, and b2 may have a value of '0'. Further, the third one a3 of the first flexible module 213A is passing through the trocar 300 and thus, the operating angle state of the third one a3 of the first nodes a1, a2, and a3 may have a value of 'x' between 0 and 1, and the third one b3 of the second nodes b1, b2, and b3 of the first flexible module 213A has completely passed through the trocar 300 and movement thereof is completely free and thus, the operating angle state of the third one b3 of the second nodes b1, b2, and b3 may have a value of '1'.

As described above, the operating angle states of the respective nodes may be changed according to change of the translational motion distance of the guide tube 213, e.g., the insertion depth of the guide tube 213 into the body of the patient. For example, when the guide tube 213 is inserted more deeply into the body of the patient than the state shown in FIG. 5, another node located at a position closer to the central region than the third one a3 of the first nodes a1, a2, and a3 of the first flexible module 213A may have the operating angle state value of '0~1'. On the other hand, when the guide tube 213 is inserted more shallowly into the body of the patient than the state shown in FIG. 5, another node located at a position closer to the end region than the third one a3 of the first nodes a1, a2, and a3 of the first flexible module 213A may have the operating angle state value of '0~1'.

Thereafter, operating angle distribution rates of the first nodes a1, a2, and a3 and the second nodes b1, b2, and b3 of the first flexible module 213A and the first nodes c1, c2, and c3 and the second nodes d1, d2, and d3 of the second flexible module 213B are calculated using the state vectors of the first nodes a1, a2, and a3 and the second nodes b1, b2, and b3 of the first flexible module 213A and the first nodes c1, c2, and c3 and the second nodes d1, d2, and d3 of the second flexible module 213B calculated through Operation S620 (Operation S630).

As described above, the three first nodes a1, a2, and a3 of the first flexible module 213A participate in the pan motion of the first flexible module 213A, and the three second nodes b1, b2, and b3 of the first flexible module 213A participate in the tilt motion of the first flexible module 213A. Further, the three first nodes c1, c2, and c3 of the second flexible module 213B participate in the pan motion of the second flexible module 213B, and the three second nodes d1, d2, and d3 of the second flexible module 213B participate in the tilt motion of the second flexible module 213B.

Therefore, the first pan motion angle of the first flexible module 213A measured through Operation S610 is equal to the sum of the operating angles of the three first nodes a1, a2, and a3, and the first tilt motion angle of the first flexible module 213A is equal to the sum of the operating angles of the three second nodes b1, b2, and b3. In the same manner, the second pan motion angle of the second flexible module 213B is equal to the sum of the operating angles of the three first nodes c1, c2, and c3, and the second tilt motion angle of the second flexible module 213B is equal to the sum of the operating angles of the three second nodes d1, d2, and d3.

Since the pan motion angle and the tilt motion angle are equal to the sum of the operating angles of the respective first nodes and the sum of the operating angles of the respective second nodes, the operating angles of the respective first nodes and the operating angles of the respective second nodes may be calculated by dividing the pan motion angles and the tilt motion angles, measured through Operation S610, by the number of the first nodes and the number of the second nodes. However, this may be applied only if movement of all nodes is completely free or movement of all nodes is completely constrained, e.g., the operating states of all nodes have the value of '1' or '0', but in a flexible mechanism having variable DOF and variable operating angle constraint according to working contents or working environments, the pan motion angles and/or the tilt motion angles may not be equally distributed to the respective nodes.

Therefore, in some example embodiments, accurate operating angles of all nodes are calculated by calculating whether or not the operating angle states of the respective nodes have the values of '0', '1', or '0~1' using the translational motion distance of the guide tube 213, measured through Operation S610, and calculating distribution rates of the pan motion angles and the tilt motion angles, measured through Operation S610, to the respective nodes using the calculated operating angle states. The pose of the guide tube 213 may be accurately estimated by calculating the accurate operating angles of all nodes and applying the calculated accurate operating angles to forward kinematics.

This will be described in detail, as follows.

Figure 7:
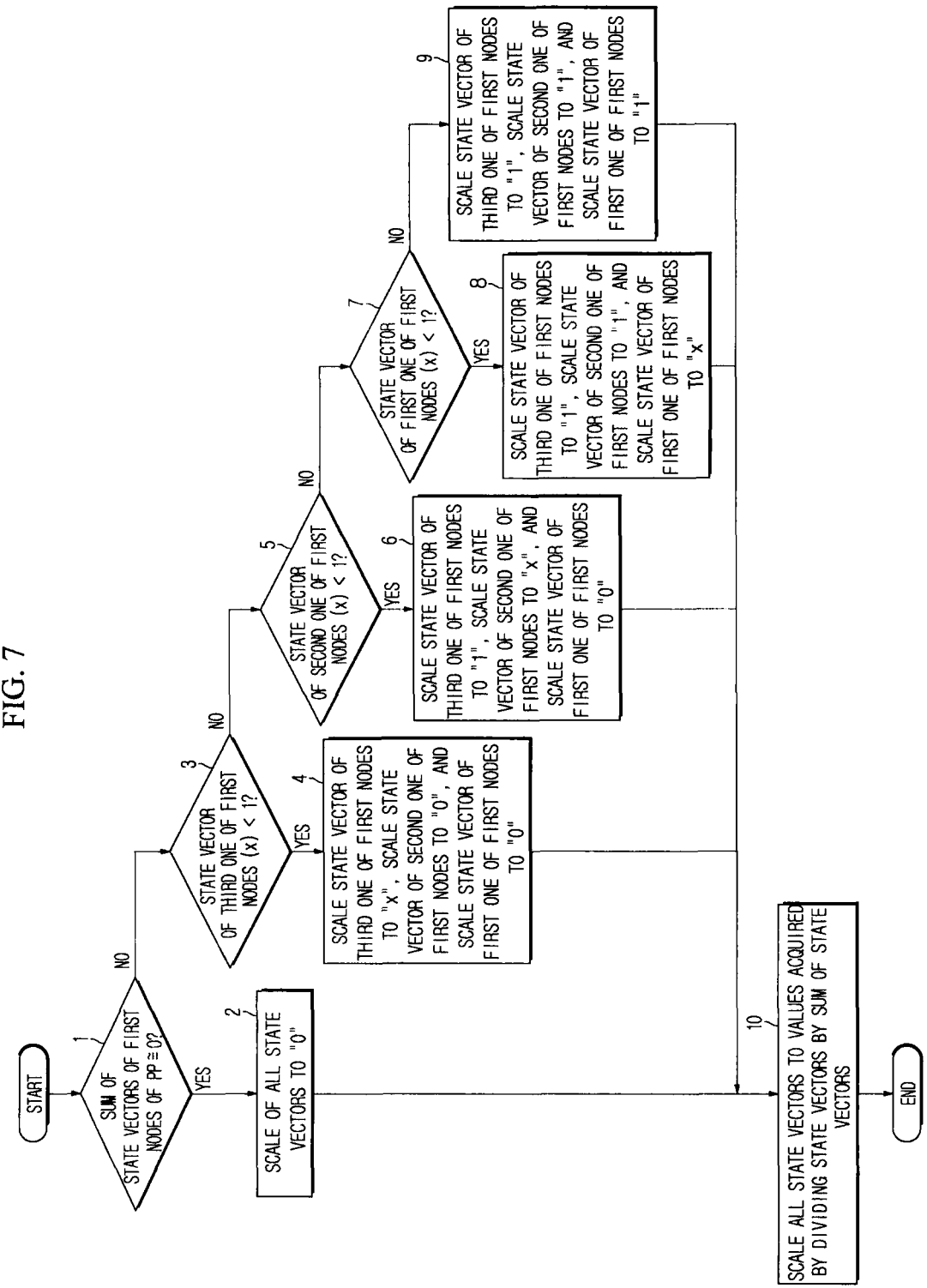
FIG. 7 is a flowchart sequentially illustrating one example of Operation S630 of FIG. 6.

FIG. 7 is a flowchart sequentially illustrating a process of calculating operating angle distribution rates of the respective first nodes a1, a2, and a3 of the first flexible module 213A. Although FIG. 7 illustrates a process of calculating operating angle distribution rates of only the first nodes a1, a2, and a3 of the first flexible module 213A, operating angle distribution rates of the second nodes b1, b2, and b3 of the first flexible module 213A, the first nodes c1, c2, and c3 of the second flexible module 213B, and the second nodes d1, d2, and d3 of the second flexible module 213B may be calculated through the process shown in FIG. 7.

With reference to FIG. 7, first, whether or not the sum of the state vectors of the first nodes a1, a2, and a3 of the first flexible module 213A, calculated through Operation S620, approaches '0' is judged (Operation 1). This serves to judge whether or not movement of all the first nodes a1, a2, and a3 of the first flexible module 213A is completely constrained. Here, in consideration of a design error, whether or not the sum of the state vectors of the first nodes a1, a2, and a3 is '0' is not judged and whether or not the sum of the state vectors of the first nodes a1, a2, and a3 approaches '0' is judged, but example embodiments are not limited thereto. As a result of judgment, if the sum of the state vectors of the first nodes a1, a2, and a3 approaches '0', it is judged that movement of all the first nodes a1, a2, and a3 of the first flexible module 213A is completely constrained, and the state vectors of the first nodes a1, a2, and a3 are scaled to '0', as follows (Operation 2).

$PP=[0\ 0\ 0]^T$

Such a state may mean that all the three first nodes a1, a2, and a3 are located between the trocar 300 and the base station 211 and are thus fixed.

As the result of judgment, if the sum of the state vectors of the first nodes a1, a2, and a3 is greater than '0' by a threshold value or more, whether or not the operating angle state value x of the first one a3 of the first nodes a1, a2, and a3 is less than '1' is judged (Operation 3). It serves to regard at least one of the three first nodes a1, a2, and a3 as being passing through the trocar 300 or having completely passed through the trocar 300 and to judge whether or not the first one a3 of the first nodes a1, a2, and a3 located at the most distal among the three first nodes a1, a2, and a3 and first inserted into the trocar 300 is passing through the trocar 300 or has passed through the trocar 300, since the sum of the state vectors of the first nodes a1, a2, and a3 does not approach '0'. An arbitrary proper value may be set as the above-described threshold value by the operator.

As a result of judgment, if the operating angle state value x of the first one a3 of the first nodes a1, a2, and a3 is less than '1', the first one a3 of the first nodes a1, a2, and a3 is regarded as being passing through the trocar 300 and the first one a1 and second one a2 of the first nodes a1, a2, and a3 are regarded as being located between the trocar 300 and the base station 211, and thus, the state vectors of the first one a1 and second one a2 of the first nodes a1, a2, and a3 are scaled to '0' and the state vector of the third one a3 of the first nodes a1, a2, and a3 is scaled to 'x' (Operation 4).

$PP=[0\ 0\ x]^T$

On the other hand, as the result of judgment, if the operating angle state value x of the third one a3 of the first nodes a1, a2, and a3 is not less than '1', the third one a3 of the first nodes a1, a2, and a3 is regarded as having completely passed through the trocar 300, and whether or not the operating angle state value x of the second one a2 of the first nodes a1, a2, and a3 which is subsequently inserted into the trocar 300, is less than '1' is judged (Operation 5). As a result of judgment, if the operating angle state value x of the second one a2 of the first nodes a1, a2, and a3 is less than '1', the second one a2 of the first nodes a1, a2, and a3 is regarded as being passing through the trocar 300 and the first one a1 is regarded as being located between the trocar 300 and the base station 211, and thus, the state vector of the first one a1 of the first nodes a1, a2, and a3 is scaled to '0', the state vector of the second one a2 of the first nodes a1, a2, and a3 is scaled to 'x', and the state vector of the third one a3 of the first nodes a1, a2, and a3 is scaled to '1', as follows (Operation 6).

$PP=[0\ x\ 1]^T$

On the other hand, as the result of judgment, if the operating angle state value x of the second one a2 of the first nodes a1, a2, and a3 is not less than '1', the second one a2 of the first nodes a1, a2, and a3 is regarded as having completely passed through the trocar 300, and whether or not the operating angle state value x of the first one a1 of the first nodes a1, a2, and a3 which is subsequently inserted into the trocar 300, is less than '1' is judged (Operation 7). As a result of judgment, if the operating angle state value x of the first one a1 of the first nodes a1, a2, and a3 is less than '1', the third one a3 and second one a2 of the first nodes a1, a2, and a3 are regarded as having completely passed through the trocar 300 and the first one a1 of the first nodes a1, a2, and a3 is regarded as being passing through the trocar 300, and thus, the state vectors of the third one a3 and second one a2 of the first nodes a1, a2, and a3 are scaled to '1', and the state vector of the first one a1 of the first nodes a1, a2, and a3 is scaled to 'x', as follows (Operation 8).

$PP=[x\ 1\ 1]^T$

On the other hand, as the result of judgment, if the operating angle state value x of the first one a1 of the first nodes a1, a2, and a3 is not less than '1', all the first nodes a3, a2, and a1 are regarded as having completely passed through the trocar 300 and, thus, the state vectors of the first nodes a3, a2, and a1 are scaled to '1', as follows (Operation 9).

$PP=[1\ 1\ 1]^T$

The state vectors of the first nodes a1, a2, and a3 participating in the pan motion of the first flexible module 213A may be scaled through such a process, and the state vectors of the second nodes b1, b2, and b3 participating in the tilt motion of the first flexible module 213A, the first nodes c1, c2, and c3 participating in the pan motion of the second flexible module 213B, and the second nodes d1, d2, and d3 participating in the tilt motion of the second flexible module 213B may also be scaled through the above-described process.

Thereafter, operating angle distribution rates of the respective first nodes a1, a2, and a3 are calculated using the state vectors scaled through the above-described process (Operation 10). Here, the operating angle distribution rates of the respective first nodes a1, a2, and a3 may be calculated by scaling the state vectors of the first nodes a1, a2, and a3 to values, acquired by dividing the state vectors of the first nodes a1, a2, and a3 by the sum of the state vectors of the first nodes a1, a2, and a3.

Now, state vectors scaled to a state in which the third one a3 of the first nodes a1, a2, and a3 has completely passed through the trocar 300, the second one a2 of the first nodes a1, a2, and a3 is passing through the trocar 300, and the first one a1 of the first nodes a1, a2, and a3 is located between the trocar 300 and the base station 211 will be exemplarily described, as follows.

$PP=[0\ x\ 1]^T$

Here, the state vector '0' of the first one a1 of the first nodes a1, a2, and a3 is scaled to '0/(x+1)', the state vector 'x' of the second one a2 of the first nodes a1, a2, and a3 is scaled to 'x/(x+1)', and the state vector '1' of the third one a3 of the first nodes a1, a2, and a3 is scaled to '1/(x+1)'. On the assumption that 'x' is '0.5', the operating angle distribution rate of the first node a1 of the first nodes a1, a2, and a3 is '0', the operating angle distribution rate of the second one a2 of the first nodes a1, a2, and a3 is '0.33', and the operating angle distribution rate of the third one a3 of the first nodes a1, a2, and a3 is '0.66'. In the same manner, operating angle distribution rates of the second nodes b1, b2, and b3 of the first flexible module 213A, the first nodes c1, c2, and c3 of the second flexible module 213B, and the second nodes d1, d2, and d3 of the second flexible module 213B may be calculated.

Thereafter, with reference to FIG. 6, operating angles of the first nodes a1, a2, and a3 of the first flexible module 213A, the second nodes b1, b2, and b3 of the first flexible module 213A, the first nodes c1, c2, and c3 of the second flexible module 213B, and the second nodes d1, d2, and d3 of the second flexible module 213B are calculated using the operating angle distribution rates of the first nodes a1, a2, and a3, the second nodes b1, b2, and b3 of the first flexible module 213A, the first nodes c1, c2, and c3 of the second flexible module 213B, and the second nodes d1, d2, and d3 of the second flexible module 213B, calculated through Operation S630 (Operation S640).

Here, the operating angles of the respective nodes may be calculated by multiplying the operating angle distribution rates of the respective nodes by the pan motion angles and the tilt motion angles, measured through Operation S610. This will be described in detail, as follows.

That is, the operating angles of the first nodes a1, a2, and a3 of the first flexible module 213A may be calculated by multiplying the calculated operating angle distribution rates of the first nodes a1, a2, and a3 by the pan motion angle of the first flexible module 213A measured through Operation S610, e.g., the first pan motion angle, the operating angles of the second nodes b1, b2, and b3 of the first flexible module 213A may be calculated by multiplying the calculated operating angle distribution rates of the second nodes b1, b2, and b3 by the tilt motion angle of the first flexible module 213A measured through Operation S610, e.g., the first tilt motion angle, the operating angles of the first nodes c1, c2, and c3 of the second flexible module 213B may be calculated by multiplying the calculated operating angle distribution rates of the second nodes c1, c2, and c3 by the pan motion angle of the second flexible module 213B measured through Operation S610, e.g., the second pan motion angle, and the operating angles of the second nodes d1, d2, and d3 of the second flexible module 213B may be calculated by multiplying the calculated operating angle distribution rates of the second nodes d1, d2, and d3 by the tilt motion angle of the second flexible module 213B measured through Operation S610, e.g., the second tilt motion angle.

For example, on the assumption that the operating angle distribution rate of the first one a1 of the first nodes a1, a2, and a3 of the first flexible module 213A is '0', the operating angle distribution rate of the second one a2 of the first nodes a1, a2, and a3 is '0.33', and the operating angle distribution rate of the third one a3 of the first nodes a1, a2, and a3 is '0.66', as described above, and the first pan motion angle of the first flexible module 213A measured through Operation S610 is 90°, the operating angle of the first one a1 of the first nodes a1, a2, and a3 of the first flexible module 213A may be calculated as 0°, the operating angle of the second one a2 of the first nodes a1, a2, and a3 may be calculated as 29.7°, and the operating angle of the third one a3 of the first nodes a1, a2, and a3 may be calculated as 59.4°.

Thereafter, with reference to FIG. 6, the position of the end of the guide tube 213 may be estimated using the operating angles of the first nodes a1, a2, and a3 of the first flexible module 213A, the second nodes b1, b2, and b3 of the first flexible module 213A, the first nodes c1, c2, and c3 of the second flexible module 213B, and the second nodes d1, d2, and d3 of the second flexible module 213B, calculated through Operation S640 (Operation S650). Here, estimation of the position of the end of the guide tube 213 may be carried out by applying the operating angles of the first nodes a1, a2, and a3 of the first flexible module 213A, the second nodes b1, b2, and b3 of the first flexible module 213A, the first nodes c1, c2, and c3 of the second flexible module 213B, and the second nodes d1, d2, and d3 of the second flexible module 213B, calculated through Operation S640, and the translational motion distance and the rotational motion angle of the guide tube 213, measured through Operation 610, to forward kinematics, but is not limited thereto. Estimation of a position by applying joint angles to forward kinematics is well known in the art, and a detailed description thereof will thus be omitted.

In this way, by calculating in real time the operating angles of the plural nodes of the guide tube 213, changed according to change of the translational motion distance of the flexible guide tube 213 having variable DOF and variable operating angle constraints and estimating the position of the end of the guide tube 213 using the calculated operating angles, the position of the guide tube 213 flexibly changed according to working contents or working environments may be more accurately estimated in real time, and the position of the surgical instruments 215 passing through the guide tube 213 may be more accurately estimated in real time using the position of the guide tube 213.

Further, not only joint angles regarding the translational motion distance and the rotational motion angle of the guide tube 213 but also constraint degrees of the respective nodes due to the trocar 300 through scaling are reflected in solutions of forward kinematics, calculated as described above. Solutions of inverse kinematics may be acquired by applying these solutions of forward kinematics to a Jacobian relational expression, and thus, more precise control may be possible.

Further, in some example embodiments, the guide tube 213 may have 2 to 6 DOF according to the translational motion distance of the guide tube 213, e.g., the insertion distance of the guide tube 213. If the guide tube 213 is inserted to a small depth and thus, the guide tube 213 has only 2 DOF, application of operation instructions regarding 6DOF is meaningless. Therefore, by setting priority of operations regarding the DOF of the guide tube 213, determining the DOF of the guide tube 213 using the measured translational motion distance of the guide tube 213, and applying operation instructions according to the set priority corresponding to the determined DOF of the guide tube 213, application of meaningless operation instructions in which the guide tube 213 is not operated may be prevented and thus, the guide tube 213 may be more effectively controlled.

For example, operating priority according to the DOF of the guide tube 213 will be determined, as stated in Table 1 below.

TABLE 1

| DOF of guide tube | Operation priority |
| --- | --- |
| 2 | z(insertion)/roll |
| 3 | z(insertion)/roll/x |
| 4 | z(insertion)/roll/x/y |
| 5 | z(insertion)/roll/x/y/pitch |
| 6 | z(insertion)/roll/x/y/pitch/yaw |

In Table 1, the DOF of the guide tube 213 may be determined by the translational motion distance of the guide tube 213. As stated in Table 1, if the guide tube 213 has 2 DOF, operation instructions, such as instructions regarding linear motion z and rotation in the roll direction, may be preferentially applied to the guide tube 213, and if the insertion depth of the guide tube 213 further increases and thus the guide tube 213 has 3 DOF, operation instructions, such as instructions regarding rotation in the x direction, in addition to instructions regarding linear motion z and rotation in the roll direction, may be preferentially applied to the guide tube 213.

Further, if the insertion depth of the guide tube 213 further increases and thus the guide tube 213 has 4 DOF, operation instructions, such as instructions regarding rotation in the y direction, in addition to instructions regarding linear motion z, rotation in the roll direction, and rotation in the x direction, may be preferentially applied to the guide tube 213. If the insertion depth of the guide tube 213 further increases and thus the guide tube 213 has 5 DOF, operation instructions, such as instructions regarding rotation in the pitch direction, in addition to instructions regarding linear motion z, rotation in the roll direction, rotation in the x direction, and rotation in the y direction, may be preferentially applied to the guide tube 213. If the insertion depth of the guide tube 213 further increases and thus the guide tube 213 has 6 DOF, operation instructions, such as instructions regarding rotation in the yaw direction, in addition to instructions regarding linear motion z, rotation in the roll direction, rotation in the x direction, rotation in the y direction, and rotation in the pitch direction, may be preferentially applied to the guide tube 213.

The above method is one example of definition of priority of operations, and priority of operations according to the DOF of the guide tube 213 is not limited thereto and may be variously modified for user convenience.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A robot control method of controlling a robot that has a flexible module including 'n' first nodes participating in pan motion and 'n' second nodes participating in tilt motion, the robot control method comprising:
    measuring a translational motion distance, a pan motion angle, and a tilt motion angle of the flexible module;
    calculating state vectors of the 'n' first nodes and the 'n' second nodes using the measured translational motion distance;
    calculating operating angle distribution rates of the 'n' first nodes using the calculated state vectors of the 'n' first nodes, and calculating operating angle distribution rates of the 'n' second nodes using the calculated state vectors of the 'n' second nodes;
    calculating operating angles of the 'n' first nodes using the calculated operating angle distribution rates of the 'n' first nodes and the measured pan motion angle, and calculating operating angles of the 'n' second nodes using the calculated operating angle distribution rates of the 'n' second nodes and the measured tilt motion angle;
    estimating a position of an end of the flexible module using the calculated operating angles of the 'n' first nodes and the calculated operating angles of the 'n' second nodes; and
    controlling the flexible module based on the estimated position of the end of the flexible module.

2. The robot control method according to claim 1, wherein the measuring of the translational motion distance, the pan motion angle, and the tilt motion angle of the flexible module comprises measuring a rotational motion angle of the flexible module.

3. The robot control method according to claim 2 wherein the estimating of the position of the end of the flexible module also uses the measured translational motion distance and the measured rotational motion angle.

4. The robot control method according to claim 3, wherein the estimating of the position of the end of the flexible module is performed by applying the calculated operating angles of the 'n' first nodes, the calculated operating angles of the 'n' second nodes, the measured translational motion distance, and the measured rotational motion angle to a forward kinematics function.

5. The robot control method according to claim 1, wherein the 'n' first nodes are arranged from a proximal position to a distal position such that a first one of the 'n' first nodes is located at the proximal position and an $n^{th}$ one of the 'n' first nodes is located at the distal position.

6. The robot control method according to claim 5, wherein the calculating of the operating angle distribution rates of the 'n' first nodes further comprises:
    judging whether or not a sum of the state vectors of the 'n' first nodes approaches '0';
    scaling all the state vectors of the 'n' first nodes to '0', upon judging that the sum of the state vectors of the 'n' first nodes approaches '0'; and
    calculating the operating angle distribution rates of the 'n' first nodes by dividing the scaled state vectors of the 'n' first nodes by a sum of the scaled state vectors.

7. The robot control method according to claim 6, further comprising, after the judging of whether or not the sum of the state vectors of the 'n' first nodes approaches '0':
    judging whether or not any first node having a state vector less than '1' is present among the 'n' first nodes, upon judging that the sum of the state vectors of the 'n' first nodes is greater than '0' by a threshold value or more;
    upon judging that the any first node having the state vector less than '1' is present among the 'n' first nodes, scaling the state vector of the corresponding first node to the calculated state vector, scaling the state vectors of the first nodes, located in a direction of the proximal position based on a corresponding first node, to '0', and scaling the state vectors of the first nodes, located in a direction of the distal position based on the corresponding first node, to '1'; and
    calculating the operating angle distribution rates of the 'n' first nodes by dividing the scaled state vectors of the 'n' first nodes by the sum of the scaled state vectors.

8. The robot control method according to claim 7, further comprising, after the judging of whether or not the any first node having the state vector less than '1' is present among the 'n' first nodes:
    upon judging that the any first node having the state vector less than '1' is not present among the 'n' first nodes, scaling all the state vectors of the 'n' first nodes to '1'; and
    calculating the operating angle distribution rates of the 'n' first nodes by dividing the scaled state vectors of the 'n' first nodes by the sum of the scaled state vectors.

9. The robot control method according to claim 1, wherein the 'n' second nodes are arranged from a proximal position to a distal position such that a first one of the 'n' second nodes is located at the proximal position and an $n^{th}$ one of the 'n' second nodes is located at the distal position.

10. The robot control method according to claim 9, wherein the calculation of the operating angle distribution rates of the 'n' second nodes comprises:
    judging whether or not a sum of the state vectors of the 'n' second nodes approaches '0';
    scaling all the state vectors of the 'n' second nodes to '0', upon judging that the sum of the state vectors of the 'n' second nodes approaches '0'; and
    calculating the operating angle distribution rates of the 'n' second nodes by dividing the scaled state vectors of the 'n' second nodes by a sum of the scaled state vectors.

11. The robot control method according to claim 10, further comprising, after the judging of whether or not the sum of the state vectors of the 'n' second nodes approaches '0':
    judging whether or not any second node having a state vector less than '1' is present among the 'n' second nodes, upon judging that the sum of the state vectors of the 'n' second nodes is greater than '0' by a threshold value or more;

upon judging that the any second node having the state vector less than '1' is present among the 'n' second nodes, scaling the state vector of a corresponding second node to the calculated state vector, scaling the state vectors of the second nodes, located in a direction of the proximal position based on the corresponding second node, to '0', and scaling the state vectors of the second nodes, located in a direction of the distal position based on the corresponding second node, to '1'; and calculating the operating angle distribution rates of the 'n' second nodes by dividing the scaled state vectors of the 'n' second nodes by the sum of the scaled state vectors.

12. The robot control method according to claim 11, further comprising, after the judging of whether or not the any second node having the state vector less than '1' is present among the 'n' second nodes:

upon judging that the any second node having the state vector less than '1' is not present among the 'n' second nodes, scaling all the state vectors of the 'n' second nodes to '1'; and calculating the operating angle distribution rates of the 'n' second nodes by dividing the scaled state vectors of the 'n' second nodes by the sum of the scaled state vectors.

13. The robot control method according to claim 1, wherein the calculating of the operating angles of the 'n' first nodes is performed by multiplying the calculated operating angle distribution rates of the 'n' first nodes by the measured pan motion angle, and wherein the calculating of the operating angles of the 'n' second nodes is performed by multiplying the calculated operating angle distribution rates of the 'n' second nodes by the measured tilt motion angle.

14. The robot control method according to claim 1, further comprising, after the measuring of the translational motion distance, the pan motion angle, and the tilt motion angle of the flexible module:

determining degrees of freedom (DOF) of the flexible module using the measured translational motion distance of the flexible module; and controlling the flexible module such that desired operations may be performed according to the determined DOF of the flexible module.

15. A robot control method of controlling a robot that has a flexible module including 'n' first nodes participating in pan motion, the robot control method comprising:

measuring a translational motion distance and a pan motion angle of the flexible module;

calculating state vectors of the 'n' first nodes using the measured translational motion distance;

calculating operating angle distribution rates of the 'n' first nodes using the calculated state vectors of the 'n' first nodes;

calculating operating angles of the 'n' first nodes using the calculated operating angle distribution rates and the measured pan motion angle;

estimating a position of an end of the flexible module using the calculated operating angles; and controlling the flexible module based on the estimated position of the end of the flexible module.

16. The robot control method according to claim 15, wherein the flexible module of the robot further includes 'n' second nodes participating in tilt motion.

17. The robot control method according to claim 15, wherein the controlling of the flexible module based on the estimated position of the end of the flexible module comprises:

setting priority of operations of the flexible module based on degrees of freedom of the flexible module; and applying operation instructions for the controlling of the flexible module according to the set priority of operations.

18. A robot control method of controlling a robot that has a flexible module including 'n' first nodes participating in tilt motion, the robot control method comprising:

measuring a translational motion distance and a tilt motion angle of the flexible module;

calculating state vectors of the 'n' first nodes using the measured translational motion distance;

calculating operating angle distribution rates of the 'n' first nodes using the calculated state vectors of the 'n' first nodes;

calculating operating angles of the 'n' first nodes using the calculated operating angle distribution rates and the measured tilt motion angle;

estimating a position of an end of the flexible module using the calculated operating angles; and controlling the flexible module based on the estimated position of the end of the flexible module.

19. The robot control method according to claim 18, wherein the flexible module of the robot further includes 'n' second nodes participating in pan motion.

20. The robot control method according to claim 18, wherein the controlling of the flexible mdule based on the estimated position of the end of the flexible module comprises:

setting priority of operations of the flexible module based on degrees of freedom of the flexible module; and applying operation instructions for the controlling of the flexible module according to the set priority of operations.

\* \* \* \* \*